(12) United States Patent
Whynot et al.

(10) Patent No.: US 9,232,192 B2
(45) Date of Patent: Jan. 5, 2016

(54) METHOD AND SYSTEM FOR VIDEO CONFERENCE SNAPSHOT PRESENCE

(71) Applicant: AVAYA, INC., Basking Ridge, NJ (US)

(72) Inventors: Stephen Whynot, Allen, TX (US); Thomas Helfand, Lucas, TX (US); Xiaohui Wei, Plano, TX (US); Greg Osterhout, Coppell, TX (US)

(73) Assignee: Avaya, Inc., Basking Ridge, NJ (US)

( * ) Notice: Subject to any disclaimer, the term of this patent is extended or adjusted under 35 U.S.C. 154(b) by 65 days.

(21) Appl. No.: 14/074,916

(22) Filed: Nov. 8, 2013

(65) Prior Publication Data
US 2015/0130892 A1 May 14, 2015

(51) Int. Cl.
*H04N 7/14* (2006.01)
*H04N 7/15* (2006.01)
*H04L 29/06* (2006.01)

(52) U.S. Cl.
CPC ............ *H04N 7/152* (2013.01); *H04L 65/1006* (2013.01)

(58) Field of Classification Search
CPC ........... H04N 7/15; H04N 7/152; H04N 7/14; H04N 7/147
USPC .............................................. 348/14.01–14.16
See application file for complete search history.

(56) References Cited

U.S. PATENT DOCUMENTS

| | | | |
|---|---|---|---|
| 2008/0068446 A1* | 3/2008 | Barkley et al. | 348/14.07 |
| 2013/0106984 A1* | 5/2013 | Wu et al. | 348/14.08 |
| 2013/0194378 A1* | 8/2013 | Brown | 348/14.09 |
| 2014/0317183 A1* | 10/2014 | Shah et al. | 709/204 |

* cited by examiner

*Primary Examiner* — Melur Ramakrishnaiah
(74) *Attorney, Agent, or Firm* — Regan L. Trumper; Cochran Freund & Young LLC

(57) ABSTRACT

Disclosed is a system and method for providing low-frame rate continuous presence for all video participants to a video conference.

17 Claims, 8 Drawing Sheets

▲ Spotlight

▲ Scrollable Grid

METHOD AND SYSTEM FOR VIDEO CONFERENCE SNAPSHOT PRESENCE

FIELD OF THE INVENTION

The field of the invention relates generally to viewing and display of video conference attendees.

BACKGROUND OF THE INVENTION

In today's market, the use of video services, such as video conferencing, is experiencing a dramatic increase. Since video services require a significantly larger amount of bandwidth compared to audio services, this has caused increased pressure on existing communication systems to provide the necessary bandwidth for video communications. Because of the higher bandwidth requirements of video, users are constantly looking for products and services that can provide the required video services while still providing lower costs. One way to do this is to provide solutions that reduce and/or optimize the bandwidth used by video services.

SUMMARY OF THE INVENTION

An embodiment of the invention may therefore comprise a method of providing a video layout for a video conference comprising a snapshot of one or more participants to the video conference, the method comprising connecting each of a plurality of endpoints to one of one or more foci, setting up, vie the one or more foci, an associated dialog with a media server, negotiating, between each of said plurality of endpoints and each of the one or more foci, via the media server, a snapshot stream, and sending, via the media server, a key frame received from a source endpoint to each other endpoint of the plurality of end points.

An embodiment of the invention may further comprise a system for providing video layout for a video conference, the system comprising a plurality of endpoints, each of the endpoints comprising a video camera, one or more foci, and a media server, wherein each of the endpoints is enabled to connect to one of the one or more foci, each of the one or more foci is enabled to set up an associated dialog with said media server, each of said endpoints is further enabled to negotiate a snapshot stream with the media server, and the media server is enabled to send a key frame received from one of the plurality of endpoints to each other endpoint of the plurality of endpoints.

DETAILED DESCRIPTION OF THE EMBODIMENTS

Figure 1:
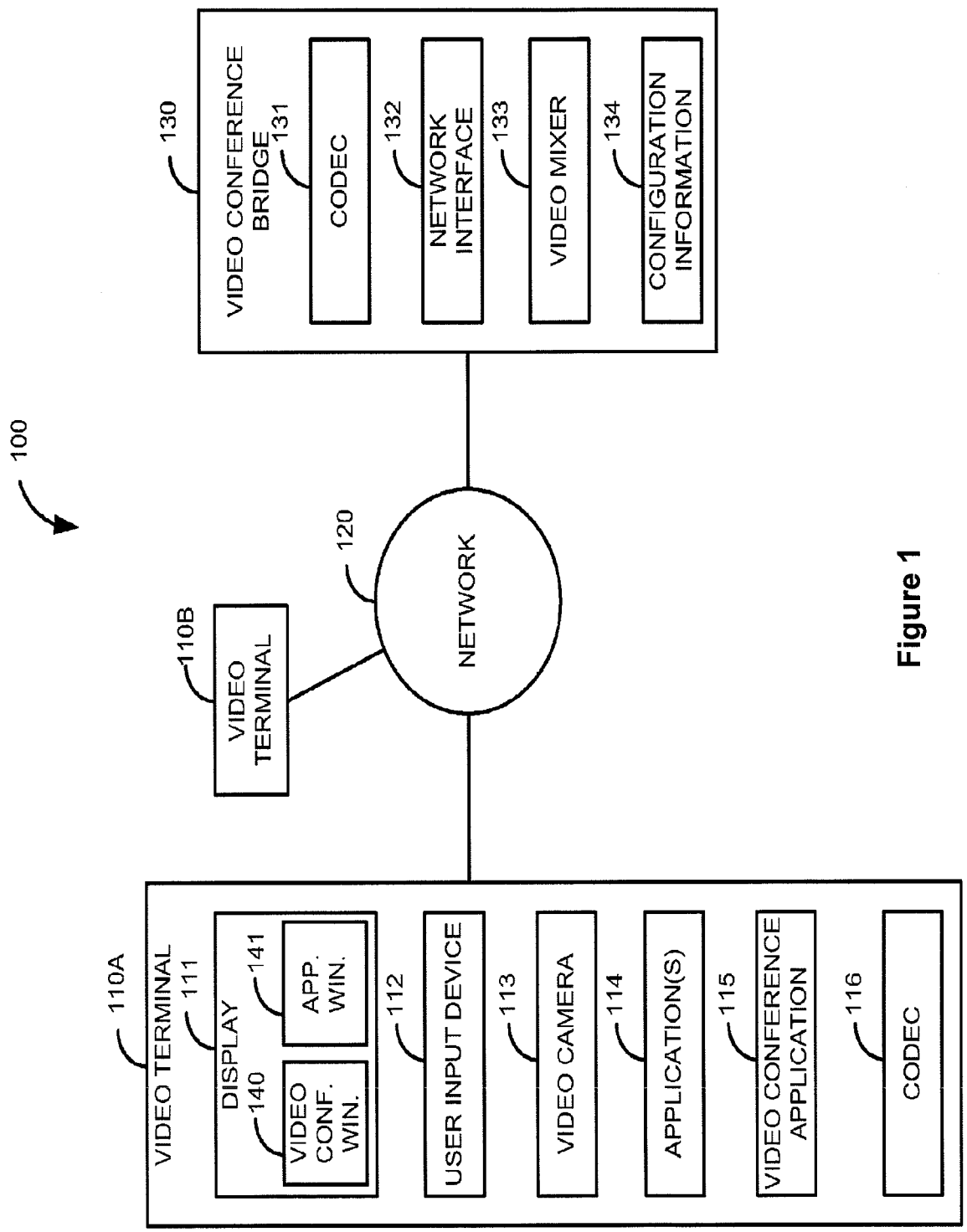
FIG. 1 shows a block diagram of a system for showing a snapshot continuous presence.

Some embodiments may be illustrated below in conjunction with an exemplary video communication system. Although well suited for use with, e.g., a system using switch (es), server(s), and/or database(s), communications en-points, etc., the embodiments are not limited to use with any particular type of video communication system or configuration of system elements.

An embodiment of the current invention provides low-frame rate continuous presence for all video participants to a video conference. The embodiment reduces resource requirements. The resource usage reduced may include network bandwidth, server-side memory due to reduced computational complexity and client-side memory due to reduced computational complexity.

In an embodiment of the invention, an additional video stream may be provided to time-multiplex non-speakers in a presence indication. The video stream may comprise a series of static independent pictures. This is in opposition to bandwidth intensive full-motion video representations of non-speaking conference attendees. A client may extract pictures of video conference attendees and appropriately display them in a user interface.

The additional video stream may be displayed in a filmstrip type mode, for example, of multiple docked windows. The stream may also be displayed in a stitched, or composed, manner into a window, or in separate windows by the client.

Scalable Coding in video is a video compression technology for encoding of high-quality video bitstream and may also contain one or more subset bitstreams that can themselves be decoded, which allows the video stream to be adapted to different network conditions and different capability end-points without video transcoding. This technology has been included in multiple video standards, such as MPEG-2, H.264/AVC, H.265/HEVC, VP8, VP9, etc. Normally, a scalable encoded stream contains one base layer and additional multiple enhancement layer(s). The base layer is encoded with the lowest spatial resolution/temporal resolution (frame rate)/quality, and provides the basic quality of service and provides conformance to the non-scalable-coding supported equipment. When a conference's basic quality of video service is the base layer video, all end-points should be negotiated to support at least the base layer video for video service, then the base layer should be decodable by all end-points in a conference without transcoding. Although the video standard H.264/AVC (Advanced Video Coding) and its SVC (Scalable Video Coding) extension may be used as an example in this document, the embodiments are not limited to H.264/AVC. They may be applied to any video standards with scalable coding technology.

A Session Description Protocol (SDP) flag may be set to identify the video stream as a snapshot, for example a=snapshot-cp. A single m-line may transport all of the snapshots of video conference attendees with the appropriate SDP flag set accordingly. As is understood, this refers to SDP parameter usage, where multiple video streams are represented by an associated media line (m=). Four video streams towards an endpoint (to display four windows) would require 4 m-lines. In an embodiment of the invention, the snapshot stream may use one of the m-lines (one RTP stream towards the endpoint) to transport all the snapshots. The video stream will contain only the base layer key frames (such IDR frames in H.264/AVC). As is understood, a "key frame" essentially meaning that it is encoded independently and it has no dependencies to the other frames to decode. A stream of key frames, each originating from a unique endpoint could be decoded by one decoder instance on the destination endpoint (essentially the decoder assigned to the snapshot RTP stream designated in the SDP) The key frames may be switched. As an example, in H.264/AVC and its SVC extension, as is also understood, a coded video sequence consists of a series of access units that are sequential in a NAL (Network Abstraction Layer) unit stream and use only one sequence parameter set. Each coded video sequence can be decoded independently of any other coded video sequence, given the necessary parameter set information, which may be conveyed "in-band" or "out-of-band". At the beginning of a coded video sequence is an instantaneous decoding refresh (IDR) access unit. An IDR access unit contains an intra picture—a coded key picture that can be decoded without decoding any previous pictures in the NAL unit stream, and the presence of an IDR access unit indicates that no subsequent picture in the stream will require reference to pictures prior to the intra picture it contains in order to be decoded. A NAL unit stream may contain one or more coded video sequence. As is understood, switched means the video streams are not decoded in the network, but instead the stream is sent to a server (AMS) and then routed to multiple endpoints. This switching/routing can be done with H.264AVC or H.264SVC. Using SVC for switching enhances its power due to the network being able to thin streams to match endpoint capabilities without decoding the video stream. EOS is end of stream. SPS/PPS is sequence parameter sets and picture parameter sets. Essentially they are the encoded configuration for the decoder.

AMS stands for "Avaya Media Server", the software based media server that is handling audio and video for many of our products in Avaya.

FIG. 1 shows a block diagram of a system for showing a snapshot continuous presence. A system 100 comprises video terminals 110A-110B, network 120, and video conference bridge 130. Video terminal 110 can be any type of communication device that can display a video stream, such as a telephone, a cellular telephone, a Personal Computer (PC), a Personal Digital Assistant (PDA), a monitor, a television, a conference room video system, and the like. Video terminal 110 further comprises a display 111, a user input device 112, a video camera 113, application(s) 114, video conference application 115 and codec 116. In FIG. 1, video terminal 110 is shown as a single device; however, video terminal 110A can be distributed between multiple devices. For example, video terminal 110 can be distributed between a telephone and a personal computer.

Display 111 can be any type of display such as a Liquid Crystal Display (LCD), a Cathode Ray Tube (CRT), a monitor, a television, and the like. Display 111 is shown further comprising video conference window 140 and application window 141. Video conference window 140 comprises a display of the stream(s) of the active video conference. The stream(s) of the active video conference typically comprises an audio portion and a video portion. Application window 141 is one or more windows of an application 114 (e.g., a window of an email program). Video conference window 140 and application window 141 can be displayed separately or at the same time. User input device 112 can be any type of device that allows a user to provide input to video terminal 110, such as a keyboard, a mouse, a touch screen, a track ball, a touch pad, a switch, a button, and the like. Video camera 113 can be any type of video camera, such as an embedded camera in a PC, a separate video camera, an array of cameras, and the like. Application(s) 114 can be any type of application, such as an email program, an Instant Messaging (IM) program, a word processor, a spread sheet, a telephone application, and the like. Video conference application 115 is an application that processes various types of video communications, such as a codec 116, a video conferencing software/software, and the like. Codec 116 can be any hardware/software that can decode/encode a video stream. Elements 111-116 are shown as part of video terminal 110A. Likewise, video terminal 110B can have the same elements or a subset of elements 111-116.

Network 120 can be any type of network that can handle video traffic, such as the Internet, a Wide Area Net-work (WAN), a Local Area Network (LAN), the Public Switched Telephone Network (PSTN), a cellular network, an Integrated Digital Services Network (ISDN), and the like. Network 120 can be a combination of any of the aforementioned networks. In this exemplary embodiment, network 120 is shown connecting video terminals 110A-110B to video conference bridge 130. However, video terminal 110A and/or 110B can be directly connected to video conference bridge 130. Likewise, additional video terminals (not shown) can also be connected to network 120 to make up larger video conferences.

Video conference bridge 130 can be any device/software that can provide video services, such as a video server, a Private Branch Exchange (PBX), a switch, a network server, and the like. Video conference bridge 130 can bridge/mix video streams of an active video conference. Video conference bridge 130 is shown external to network 120; how-ever, video conference bridge 120 can be part of network 120. Video conference bridge 130 further comprises codec 131, network interface 132, video mixer 133, and configuration information 134. Video conference bridge 130 is shown comprising codec 131, network interface 132, video mixer 133, and configuration information 134 in a single device; however, each element in video conference bridge 130 can be distributed.

Codec 131 can be any hardware/software that can encode a video signal. For example codec 131 can encode one or more compression standards, such as H.265, H.264, H.263, VC-1, VP8, VP9, and the like. Codec 131 can encode video protocols at one or more levels of resolution. Network interface 132 can be any hardware/software that can provide access to network 120 such as a network interface card, a wireless network card (e.g., 802.11g), a cellular interface, a fiber optic network interface, a modem, a T1 interface, an ISDN interface, and the like. Video mixer 133 can be any hardware/software that can mix two or more video streams into a composite video stream, such as a video server. Configuration information 134 can be any information that can be used to determine how a stream of the video conference can be sent. For example, configuration information 134 can comprise information that defines under what conditions a specific video resolution will be sent in a stream of the video conference, when a video portion of the stream of the video conference will or will not be sent, when an audio portion of the stream of the video conference will or will not be sent, and the like. Configuration information 134 is shown in video conference bridge 130. However, configuration information 134 can reside in video terminal 110A.

After a video conference is set up (typically between two or more video terminals 110), video mixer 133 mixes the video streams of the video conference using known mixing techniques. For example, video camera 113 in video terminal 110A records an image of a user (not shown) and sends a video stream to video conference bridge 130, which is then mixed (usually if there are more than two participants in the video conference) by video mixer 133. In addition, the video conference can also include non-video devices, such as a telephone (where a user only listens to the audio portion of the video conference). Network interface 132 sends the stream of the active video conference to the video terminals 110 in the video conference. For example, video terminal 110A receives the stream of the active video conference. Codec 116 decodes the video stream and the video stream is displayed by video conference application 115 in display 111 (in video conference window 140).

Figure 2A:
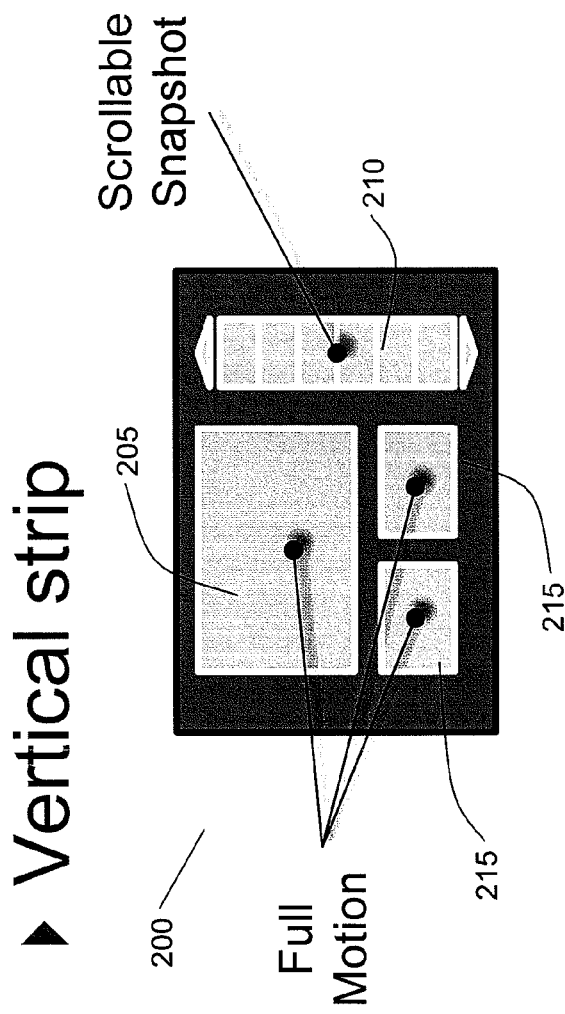
FIG. 2A shows a vertical strip user interface snapshot display.

FIG. 2A shows a vertical strip user interface snapshot display. A user interface 200 provides a plurality of locations to display one or more visual representations of participants to a video conference. Full motion representations may be provided for a current active speaker 205 and for those deemed by an algorithm to satisfy active participants 215. A scrollable snapshot 210 may be provided of other participants to the conference. It is understood that the scroll-ability of the scrollable snapshots 210 may be such as is commonly used whether from a desktop format or a finger flick type motion on a mobile format. As noted above, the active participant 215 full motion representations may be due to a predetermined algorithm for determining which active participants to display in a full motion manner. A video participant user may also substitute a representation from the scrollable snapshot 210 to the active participant 215. This may be done by a participant for personal preference reasons. This may also be done by a drag and drop, single or double click or other means known in the art to move and select different options or representations of different types of icons and similar items.

Figure 2B:
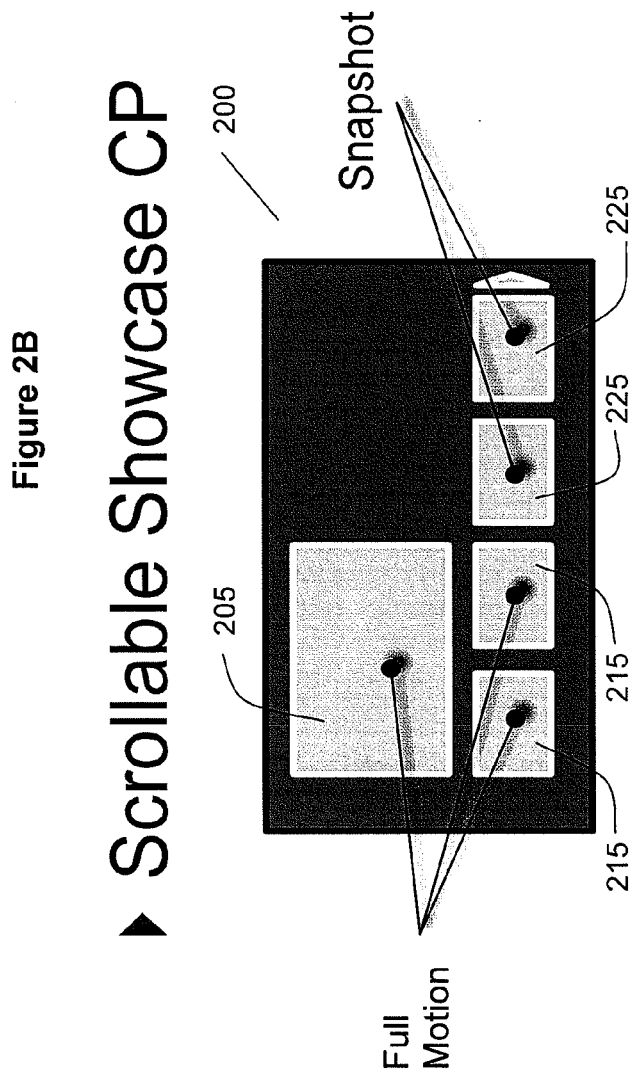
FIG. 2B shows a scrollable showcase continuous presence (CP) user interface snapshot display.

FIG. 2B shows a scrollable showcase continuous presence (CP) user interface snapshot display. A user interface 200 provides a plurality of locations to display one or more visual representations of participants to a video conference. Full motion representations maybe provided for a current active speaker 205 and for those deemed by an algorithm to satisfy active participants 215. A scrollable snapshot 225 may be provided of other participants to the conference. It is understood that the scroll-ability of the scrollable snapshots 210 may be such as is commonly used whether from a desktop format or a finger flick type motion on a mobile format. As noted above, the active participant 215 full motion representations may be due to a predetermined algorithm for determining which active participants to display in a full motion manner. A video participant user may also substitute a representation from the scrollable snapshot 225 to the active participant 215. This may be done by a participant for personal preference reasons. This may also be done by a drag and drop, single or double click or other means known in the art to move and select different options or representations of different types of icons and similar items.

Figure 2C:
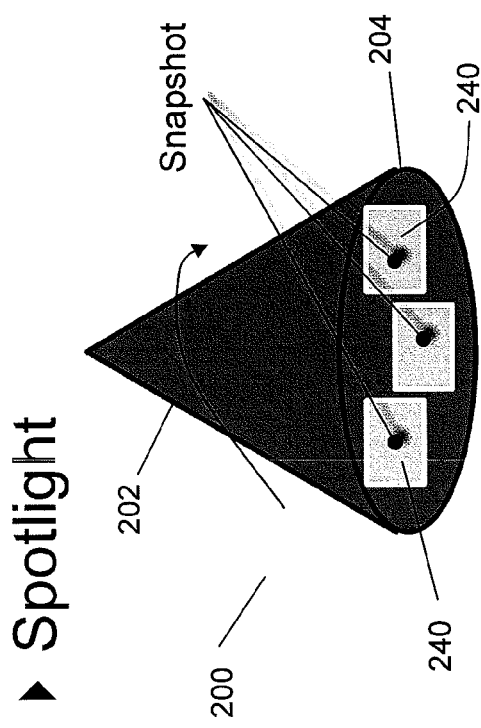
FIG. 2C shows a spotlight user interface snapshot display.

FIG. 2C shows a spotlight user interface snapshot display. A user interface 200 provides a geometric visual display mechanism 202. Shown here is a conical display 202. In the base portion 204 of the display are a plurality of snapshots 240. A full motion image of active participants and an current active speaker (not shown) may be shown in the upper portion of the geometric display 202. The geometric display 202 may be rotatable to provide access to other active participants and to scroll through more snapshots of participants.

Figure 2D:
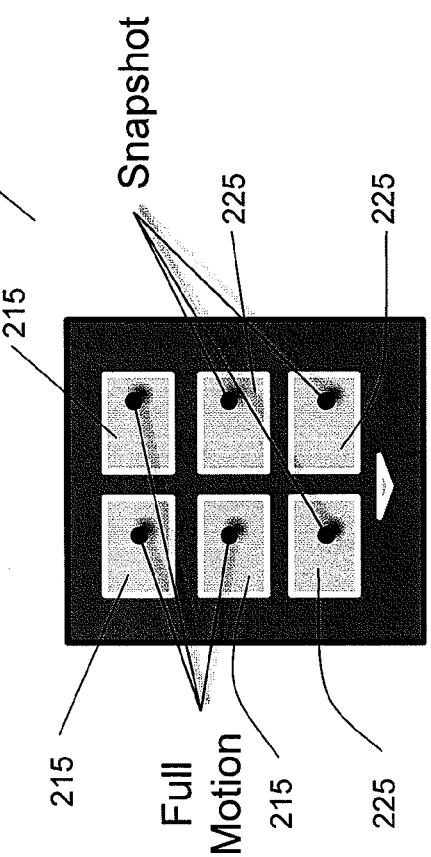
FIG. 2D shows a scrollable grid user interface snapshot display.

FIG. 2D shows a scrollable grid user interface snapshot display. A user interface 200 provides a plurality of locations to display one or more visual representations of participants to a video conference. Full motion representations maybe provided for a current active speaker 205 and for those deemed by an algorithm to satisfy active participants 215. A scrollable snapshot 225 may be provided of other participants to the conference. It is understood that the scroll-ability of the scrollable snapshots 210 may be such as is commonly used whether from a desktop format or a finger flick type motion on a mobile format. As noted above, the active participant 215 full motion repres3entations may be due to a predetermined algorithm for determining which active participants to display in a full motion manner. A video participant user may also substitute a representation from the scrollable snapshot 225 to the active participant 215. This may be done by a participant for personal preference reasons. This may also be done by a drag and drop, single or double click or other means known in the art to move and select different options or representations of different types of icons and similar items.

Consistent with the possible layouts presented in FIGS. 2A-2D, embodiments of the inventions provide low-frame rate continuous presence for all video participants. An additional video stream may be provided which allows for time-multiplex of non-speakers. For the snapshot images and display, the video stream may be a series of static independent pictures, not full-motion video. As such, a client mechanism extracts the pictures and display the pictures as appropriate in the user interface. As shown in FIGS. 2A-2D, the stream may be displayed in a filmstrip format of multiple docked windows. The stream may also be displayed as stitched, or composed, into one window or separate windows. It is understood, that in embodiments of the invention, the snapshot pictures may be best effort updates of participants and not necessarily real-time images. Further, a "self-see" aspect may be such that a participant would not have an image of themselves presented in the layout. The AMS would simply not send the image to the user.

In an embodiment of the invention, the parameters for a continuous presence snapshot may be negotiated to the SVC base layer. It is understood that the SVC base layer is the lowest resolution spatial layer AVC stream. A single m-line may be used to transport all acquired snapshots. An SDP flag may be set, such as a=snapshot-cp. This lowest resolution spatial layer AVC stream may accordingly contain only base layer IDR pictures.

An endpoint in a video conference setup in an embodiment of the invention may be responsible for some of the functions relating to the display of snapshots as discussed in this specification. Those discussed here are additional to those mentioned elsewhere as functions or steps performed at an endpoint. For instance, an endpoint may be responsible for layout and implementation of snapshot presence on a user interface. This may include including a snapshot SDP attribute in a continuous presence mode when such a layout is selected. An endpoint may map received frames from AMS to layout the filmstrip or other layout. The endpoint may decode the H.264 (or other format where appropriate) video frame. The AMS ensures that the same decoder instance can decode all received frames. The endpoint may use CSRC to overlay an active speaker. The endpoint may render the video.

As is understood, a CSRC represents a "contributing source". The CSRC is an aspect of the RTP (Real-time Transport Protocol) concept. In an example, with video it is an assigned number that is transported with the video stream in the CSRC field of the RTP packets. This number is correlated to the roster so that the endpoint knows that N="ParticipantA" and can overlay the name on the video window, or in this case, on the snapshot of a video.

In an embodiment of the invention, a unique RTCP may be used to request base layer only key frame. This may be a function performed during a negotiation phase. This would be requested from AMS->Endpoint over RTCP (RTP control protocol) to solicit a snapshot. In other words, as an example, there may be 100 people in a conference, and with 8 windows available on a particular UI to display the most active video participants. Instead of allowing video streams from the remaining 92 people to be sent to AMS to go nowhere, the video streams are halted over RTCP (with an extension). When a snapshot is required or desired, a request can be transmitted to an endpoint to generate a snapshot.

Figure 3:
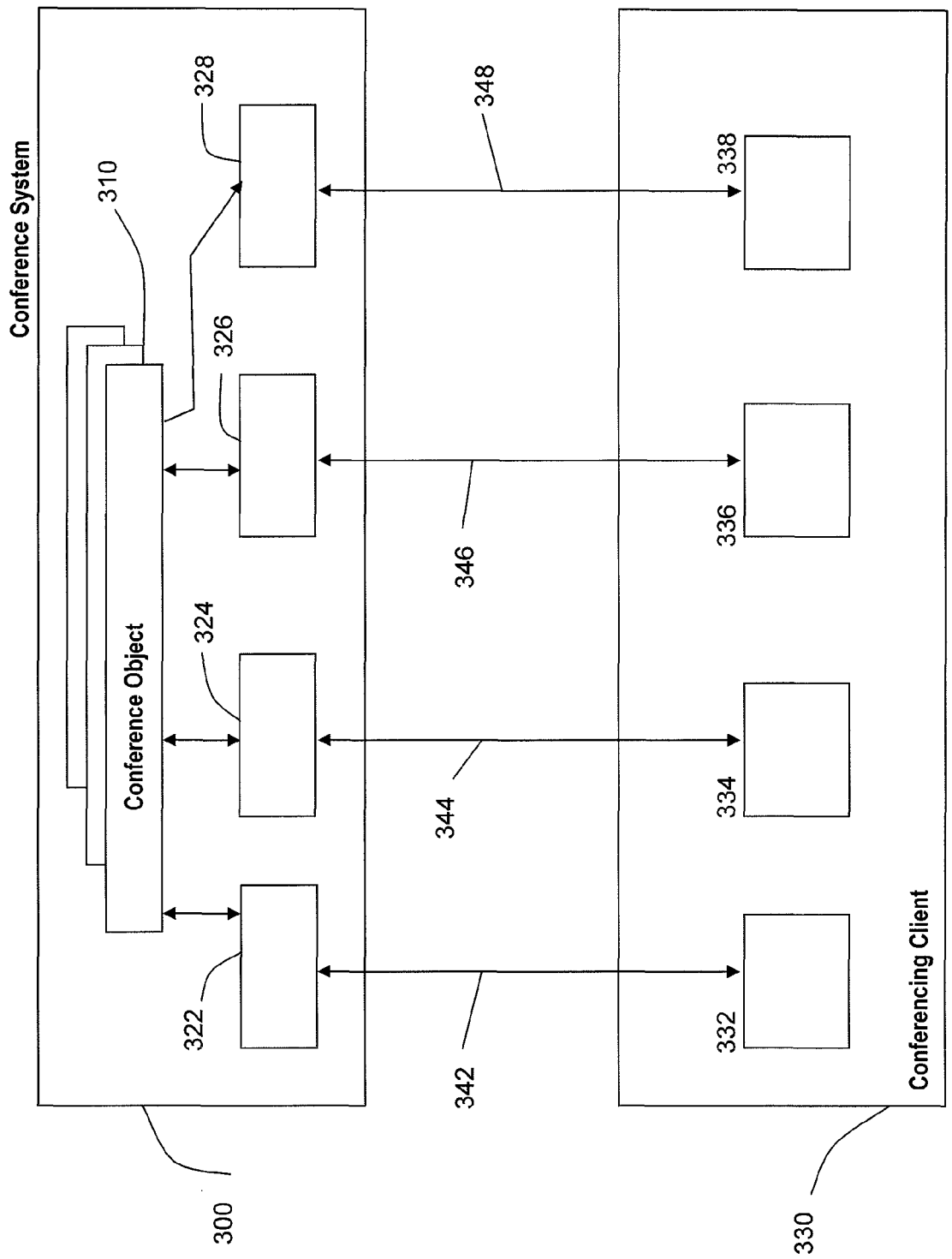
FIG. 3 shows a conferencing system.
Figure 4A:
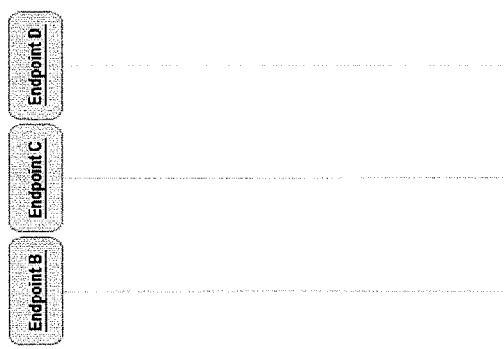
FIG. 4A shows a flow diagram of a snapshot continuous presence.
Figure 4A:
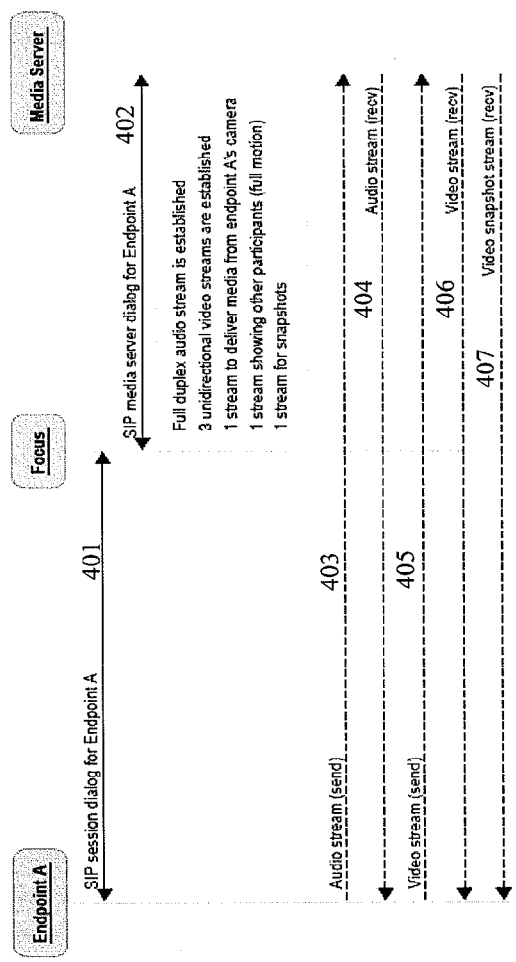
Figure 4B:
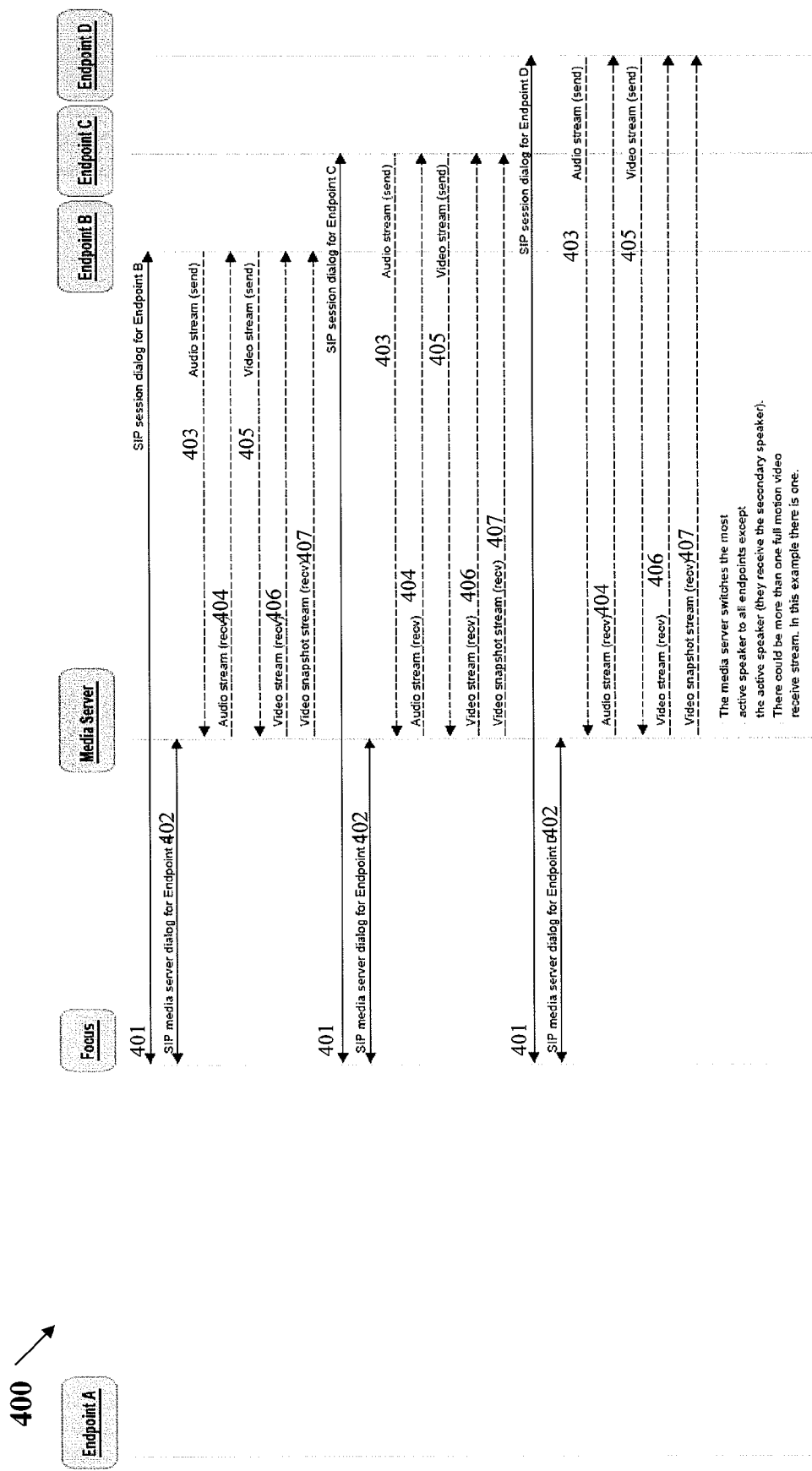
FIG. 4B shows a flow diagram of a snapshot continuous presence.
Figure 4C:
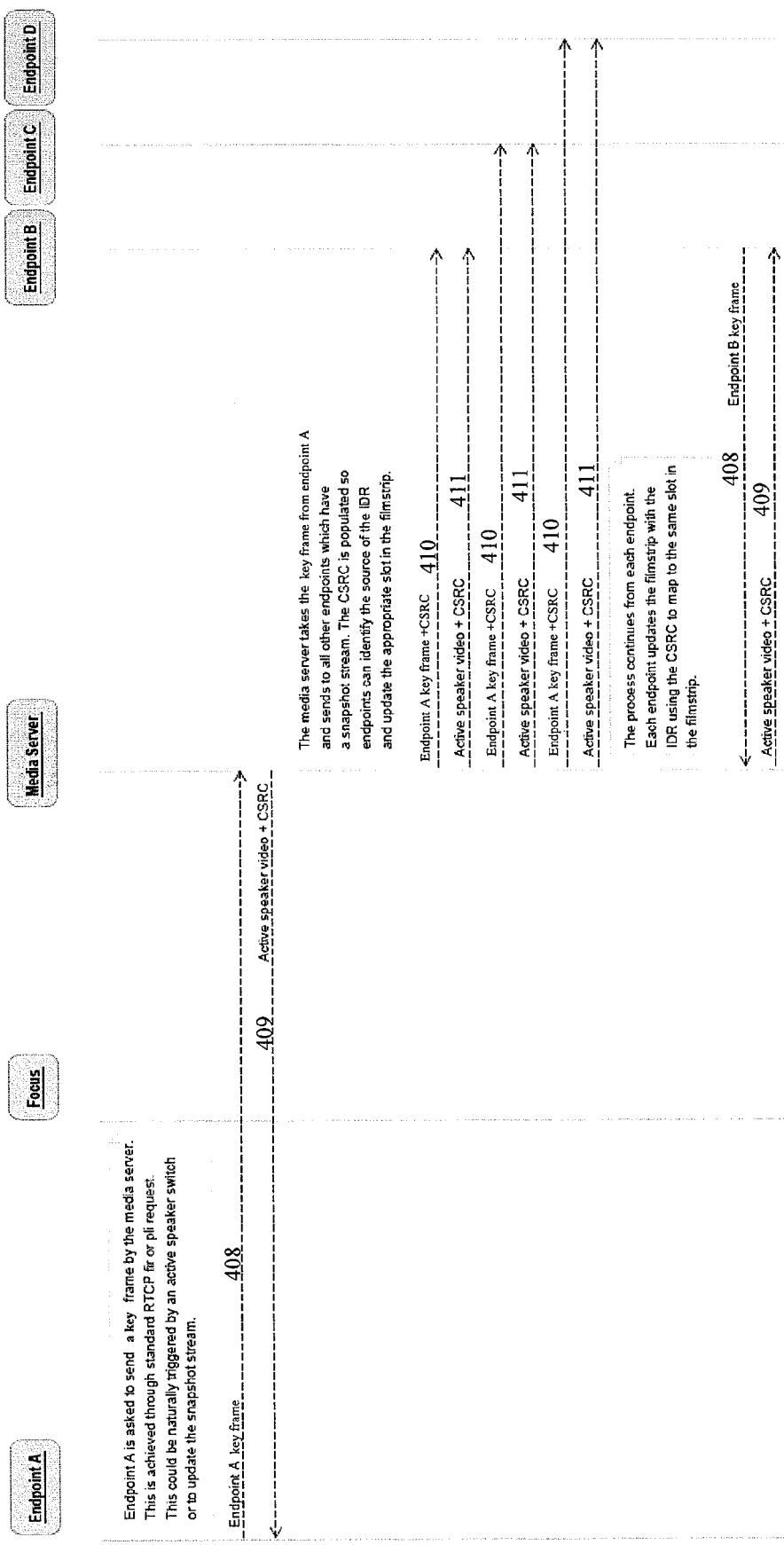
FIG. 4C shows a flow diagram of a snapshot continuous presence.
Figure 4D:
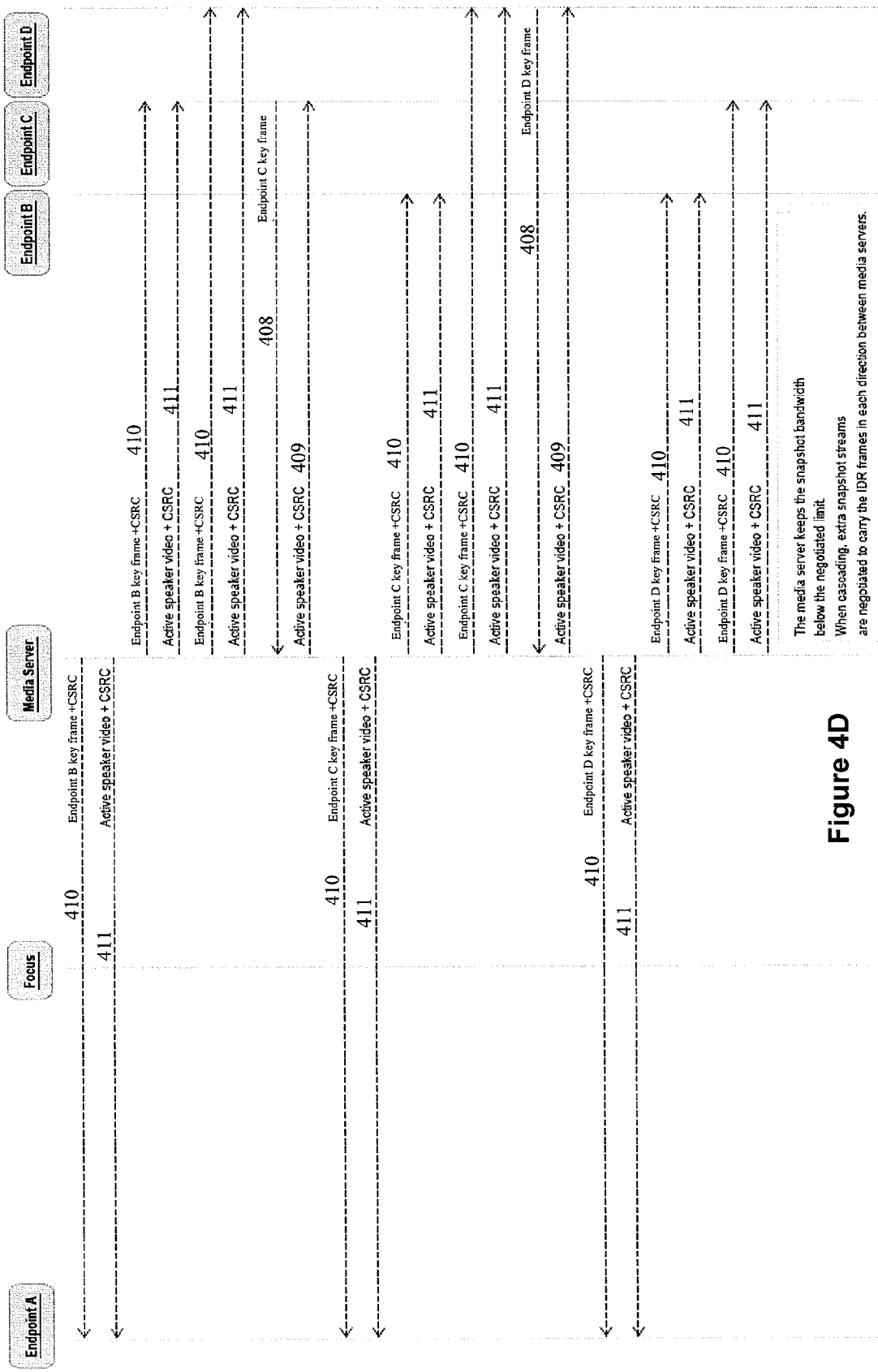
FIG. 4D shows a flow diagram of a snapshot continuous presence.

FIG. 3 shows a centralized conferencing system. The centralized conferencing system comprises a conference system 300 and a conferencing client 330. The conference system comprises a plurality of conference objects 310, a conference and media control client 322, a floor control server 324, foci 326 and a notification service 328. The conferencing client 330 comprises a conference and media control client 332, a floor control client 334, a call signaling client 336 and a notification client 338. The conference control server 322 communicates with the conference and media control client 332 via a conference control protocol 342. The floor control server 324 communicates with the floor control client 334 via a binary floor control protocol 344. The foci 326 communicates with the call signaling client 336 via a call signaling protocol 346. The notification service 328 communicates with the notification client 338 via a notification protocol 348.

In an embodiment of the invention, a centralized conference is an association of endpoints. These endpoints are the conference participants. A central endpoint is called a conference focus. The focus will have direct peer relationships with the participants by maintaining a separate call signaling interface with each one. A focus is a logical entity that maintains the call signaling interface with each participating client and the conference object representing the active state. It is understood that a multi-conferencing unit (MCU) may comprise a conference focus and a media server. As such, the focus acts as an endpoint for each of the supported signaling protocols and is responsible for all primary conference membership operations (e.g., join, leave, update the conference instance) and for media negotiation/maintenance between a conference participant and the focus.

A conference supported by the model shown in FIG. 3 may be supported using basic SIP signaling functionality with a participant serving as the focus.

In addition to the basic features shown in FIG. 3, a conferencing system supporting the centralized conferencing model proposed may offer a functionality including dedicated conferencing applications with explicitly defined capabilities, reserved recurring conferences, along with providing the standard protocols for managing and controlling the different attributes of the conferences.

The focus may control one or more mixers. A media server may serve as a mixer. The media serve may also perform other media related functions, such as IVR, for example. The media servers can be distributed and multiple media servers can be in a single conference instance, which is what is loosely referred to as cascading.

Continuing with FIG. 3, the centralized conferencing system shown is built around a fundamental concept of a conference object. A conference object represents a conference at a certain stage (e.g., description upon conference creation, reservation, activation, etc.), which a conferencing system maintains in order to describe the system capabilities and to provide access to the services available for each object independently. A conference object provides the data representation of a conference during each of the various stages. A conference object is accessed via the logical functional elements, with which a conferencing client interfaces, using the various protocols identified in FIG. 1. The functional elements defined for a conferencing system describe by FIG. 1 are a conference control server, floor control server, any number of foci, and a notification service. A conference control protocol (CCP) provides the interface between a conference and media control client and the conference control server. A floor control protocol, provides the interface between a floor control client and the floor control server. A floor control protocol may be a Binary Floor Control Protocol or other protocol known in the art. A call signaling protocol provides the interface between a call signaling client and a focus. A call signaling protocol may be SIP, H.323, Jabber, Q.931, ISUP or other protocol known in the art. The term "call" may refer to a channel or session used for media streams. A notification protocol provides the interface between the conferencing client and the notification service. A notification protocol may be SIP Notify or other protocol known in the art.

A conferencing system may support a subset of the conferencing functions depicted in the conferencing system logical decomposition shown in FIG. 3. However, there are some components that might typically be used by most other advanced functions, such as the notification service. For example, the notification service is used to correlate information, such as the list of participants with their media streams, between the various other components.

The media graph of a conference can be centralized, decentralized, or any combination of both and potentially differ per media type. In the centralized case, the media sessions are established between a media mixer controlled by the focus and each one of the participants. In the decentralized (i.e. distributed) case, the media graph is a multicast or multi-unicast mesh among the participants. Accordingly, the media processing (e.g. mixing) can be controlled either by the focus alone or by the participants.

FIGS. 4A, 4B, 4C and 4D is flow diagram of a snapshot continuous method. FIGS. 4A-4D are a continuation of an example of a flow of communications for an embodiment of the invention. In the flow 400, four endpoints are shown. These are Endpoint A, Endpoint B, Endpoint C and Endpoint D. A Focus and a Media Server are shown. It is understood that a variable number of Endpoints are possible depending of system limits and the number of participants that engage in a video conference. It is also understood that the Focus and Media Server may be part of a single unit or may be separated into separate units.

In step 401, an SIP session dialog for the Endpoints A-D is established with the Focus. In step 402, an SIP media server dialog for Endpoints A-D is established. A full duplex audio stream is established for each Endpoint, A-D. This full duplex audio stream may comprise the establishment of three unidirectional video streams, including a stream to deliver media from an Endpoint's camera, a stream showing other participants (full motion), and a stream for snapshots. In step 403, an audio stream is sent from an Endpoint, A-D, to the Media Server. In step 404, a response acknowledging receipt of the audio stream is sent from the media server to the endpoint. In step 405, a video stream is sent from the Endpoint, A-D, to the Media Server. In step 406, a video stream received response is sent from the Media Server to the Endpoint, A-D. In step 407, a video snapshot stream received is sent from the Media Server to the Endpoint, A-D.

Continuing with FIGS. 4A-4D, the Media Server requests that the Endpoint, A-D, send a key frame to the Media Server. This may be achieved through standard RTCP fir (full intra request) or pli (picture loss indication) requests. It is understood that this may be triggered by an active speaker switch or to update the snapshot stream. In step 408, a key frame and CSRC is sent from and Endpoint, A-D, to the Media Server. In step 409, the Media Server identifies an Active Speaker video and a CSRC back to the Endpoint, A-D.

The Media Server will take the key frame from an Endpoint, A-D, and send to the other Endpoints, A-D, which have a snapshot stream. The CSRC is populates to Endpoints, A-D, can identify the source of the key frame and update the appropriate slot in an accompanying filmstrip, or other layout. In step 410, the Media Server provides a first Endpoint's key frame and CSRC, for example Endpoint A's key frame and CSRC, to the other Endpoints, B-D. In step 411, the Media Server provides the active speaker video and CSRC of a first Endpoint, for example the active speaker video and CSRC of Endpoint A, to the other Endpoints, B-C.

As noted in FIG. 4, the process described applies to all Endpoints. Each Endpoint will update the filmstrip, or other layout, with the key frame using the CSRC to map the same slot in the filmstrip.

As discussed in this description, in embodiments of the invention, Endpoints will connect to a focus using SIP. The focus will set up an associated dialog to the Media Server using SIP. The Endpoints will negotiate a snapshot stream, using SDP for instance, with the Media Server trough the Focus. This may be achieved by including an extra receive-only, from the perspective of an Endpoint, base layer video M-line with a snapshot attribute present. The Media Server will use the key frames it receives from the Endpoints and send them on at a throttled frame rate to each Endpoint that negotiated snapshot Continuous Presence. The key frames will be sent on the snapshot Continuous Presence stream corresponding to the video m-line in the SDP. This will look like any other video stream on the wire, but at a lower frame rate.

The frame sent from the Media Server will have a CSRC identifying the source endpoint so that the client can update the correct window in the filmstrip, or other layout. If f an endpoint does not respond, or has not sent a key frame for a configurable time limit, the Media Server will solicit a key frame from the Endpoint and send it to the other Endpoint s to update the snapshot.

The Media Server will maintain the downstream bandwidth to each Endpoint below a negotiated limit. Also, when cascading, each Media Server is responsible for the Endpoints attached to it. Cascading is understood to be a succession of stages, or units. The Media Server in question will send a snapshot stream up to a hosting Media server where it will send to its local clients, as well as to other media servers. The host media server will in turn send its key frames from its Endpoints to all the cascading media servers. The cascading snapshot links are accordingly kept under the negotiated bandwidth.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of providing a video layout for a video conference comprising a snapshot of one or more participants to the video conference, said method comprising:

connecting each of a plurality of endpoints to one of one or more foci, wherein each of said one or more foci comprises a central endpoint having a direct peer relationship with each connected plurality of endpoints by maintaining a separate call signaling interface;

setting up, via said one or more foci, an associated dialog with a media server;

negotiating, between each of said plurality of endpoints and each of said one or more foci, via said media server, a snapshot stream; and sending, via said media server, a key frame received from a source endpoint to each other endpoint of said plurality of end points.

2. The method of claim 1, wherein said process of connecting comprises connecting each of a plurality of endpoints to one of one or more foci using Session Initiation Protocol.

3. The method of claim 1, wherein said step of setting up an associated dialog comprises setting up an associated dialog with the media server using Session Initiation Protocol.

4. The method of claim 1, wherein said process of negotiating a snapshot stream comprises negotiating a snapshot stream using SDP and by including an extra receive-only base layer video m-line with a snapshot attribute present.

5. The method of claim 1 wherein:
said process of connecting comprises connecting each of a plurality of endpoints to one of one or more foci using Session Initiation Protocol;
said step of setting up an associated dialog comprises setting up an associated dialog with the media server using Session Initiation Protocol; and
said process of negotiating a snapshot stream comprises negotiating a snapshot stream using SDP and by including an extra receive-only base layer video m-line with a snapshot attribute present.

6. The method of claim 1, wherein said frame sent by the media server to each other endpoint comprises a Real Time Protocol contributing source identifying said source endpoint.

7. The method of claim 1, wherein, if an endpoint does not send a key frame for a predetermined period of time, soliciting, via said media server, a key frame from said endpoint that did not send a key frame and sending said key frame to each other endpoint to update said snapshot.

8. The method of claim 1, wherein said key frame is sent in the lowest spatial layer.

9. The method of claim 1, further comprising laying out any key frame snapshots received at each of said plurality of endpoints in a predetermined arrangement.

10. The method of claim 9, wherein said predetermined arrangement is a filmstrip window.

11. A system for providing video layout for a video conference, said system comprising:
a plurality of endpoints, each of said endpoints comprising a video camera;
one or more foci, wherein each of said one or more foci comprises a central endpoint having a direct peer relationship with each connected plurality of endpoints by maintaining a separate call signaling interface; and
a media server;
wherein each of said endpoints is enabled to connect to one of said one or more foci, each of said one or more foci is enabled to set up an associated dialog with said media server, each of said endpoints is further enabled to negotiate a snapshot stream with said media server, and said media server is enabled to send a key frame received from one of said plurality of endpoints to each other endpoint of said plurality of endpoints.

12. The system of claim 11, wherein said connection comprises a Session Initiation Protocol, said set up of an associated dialog comprises Session Initiation Protocol, and said negotiation of a snapshot stream comprises a negotiation using SDP and inclusion of an extra receive-only base layer video m-line with a snapshot attribute.

13. The system of claim 11, wherein said frame sent by the media server to each other endpoint comprises a Real Time Protocol contributing source identifying said source endpoint.

14. The system of claim 11, wherein, if an endpoint does not send a key frame for a predetermined period of time, the media server is further enabled to solicit a key frame from said endpoint that did not send a key frame and sending said key frame to each other endpoint to update said snapshot.

15. The system of claim 11, wherein said key frame is sent in the lowest spatial layer.

16. The system of claim 11, wherein each endpoint is further enabled to layout any key frame snapshots received in a predetermined arrangement.

17. The system of claim 16, wherein said predetermined arrangement is a filmstrip window.

\* \* \* \* \*